(12) United States Patent
Kim (10) Patent No.: US 7,800,984 B2
(45) Date of Patent: *Sep. 21, 2010

(54) METHOD FOR CHECKING DISK LOADING STATUS IN OPTICAL DISK DRIVER

(75) Inventor: Mi Young Kim, Jeonju (KR)

(73) Assignee: LG Electronics Inc., Seoul (KR)

( * ) Notice: Subject to any disclaimer, the term of this patent is extended or adjusted under 35 U.S.C. 154(b) by 179 days.

This patent is subject to a terminal disclaimer.

(21) Appl. No.: 11/482,146

(22) Filed: Jul. 7, 2006

(65) Prior Publication Data

US 2006/0250913 A1    Nov. 9, 2006

Related U.S. Application Data

(63) Continuation of application No. 09/662,023, filed on Sep. 14, 2000, now Pat. No. 7,180,840.

(30) Foreign Application Priority Data

Sep. 14, 1999    (KR) ............................... 1999-39419

(51) Int. Cl.
   *G11B 21/08* (2006.01)
(52) U.S. Cl. .................................................. 369/30.36
(58) Field of Classification Search ....................... None
   See application file for complete search history.

(56) References Cited

U.S. PATENT DOCUMENTS

| | | | |
|---|---|---|---|
| 4,594,700 A | | 6/1986 | Takahashi et al. |
| 4,688,124 A | | 8/1987 | Scribner et al. |
| 4,782,473 A | | 11/1988 | Masaki |
| 4,995,027 A | * | 2/1991 | Aoyagi et al. ................ 720/626 |
| 5,075,805 A | * | 12/1991 | Peddle et al. .................. 360/61 |
| 5,191,569 A | | 3/1993 | Kurosawa et al. |
| 5,574,711 A | | 11/1996 | Nakamichi |
| 5,721,715 A | | 2/1998 | Mitani et al. |
| 5,793,728 A | | 8/1998 | Selby et al. |
| 5,828,641 A | * | 10/1998 | Abe et al. .................... 720/645 |
| 5,878,005 A | | 3/1999 | Tonegawa et al. |
| 7,180,840 B1 | * | 2/2007 | Kim .......................... 369/53.2 |

FOREIGN PATENT DOCUMENTS

| | | |
|---|---|---|
| JP | 60136059 A | 7/1985 |
| JP | 404019827 A | 1/1992 |
| JP | 405182236 A | 7/1993 |

* cited by examiner

*Primary Examiner*—Daniell L Negrón
*Assistant Examiner*—Henok G Heyi
(74) *Attorney, Agent, or Firm*—Birch, Stewart, Kolasch & Birch, LLP (57) ABSTRACT

A method for checking a disk loading status in an optical disk driver including the steps of: discriminating a loading status of an optical disk during multiple loading stages of the disk; transmitting information to a host connected through an interface to the optical disk driver in case that disk has been jammed upon discrimination; and performing disk-ejection operation according to a disk ejection command received from the host, wherein in the step of discriminating the loading status of an optical disk by during multiple loading stages of the disk, a loading status of an optical disk is discriminated on the basis of sensing signals respectively outputted from a plurality of optical sensor for sensing a size of the optical disk and from a loading switch for sensing whether the optical disk has been clamped.

6 Claims, 7 Drawing Sheets

MODE PARAMETER HEADER

FIG.6B

CD-ROM MEDIUM TYPE CODES

| CODE | MEDIUM TYPE DESCRIPTION |
|------|-------------------------|
| 00H | DOOR CLOSED/CADDY INSERTED, MEDIUM TYPE UNKNOWN |
| 01H | 120MM CD-ROM DATA ONLY CLOSED OR CADDY INSERTED |
| 02H | 120MM CD-ROM AUDIO ONLY, DOOR CLOSED OR CADDY INSERTED |
| ⋮ | ⋮ |

FIG.7

METHOD FOR CHECKING DISK LOADING STATUS IN OPTICAL DISK DRIVER

This application is Continuation of application Ser. No. 09/662,023 filed on Sep. 14, 2000 now U.S. Pat. No. 7,180,840, and for which priority is claimed under 35 U.S.C. §120; and this application claims priority of Application 39149/1999 filed in Korea on Sep. 14, 1999 under 35 U.S.C. §119; the entire contents of all are hereby incorporated by reference.

BACKGROUND OF THE INVENTION

1. Field of the Invention

The present invention relates to a method for checking a disk loading status in an optical disk driver, and more particularly to a method for checking a disk loading status in an optical disk driver of slot loading type in which a disk loading status is detected and discriminated during the multiple loading stages of inserting a disk into an optical disk driver such as a CD-ROM driver so that when the disk is discriminated as being jammed, it is automatically unloaded.

2. Description of the Background Art

Figure 1:
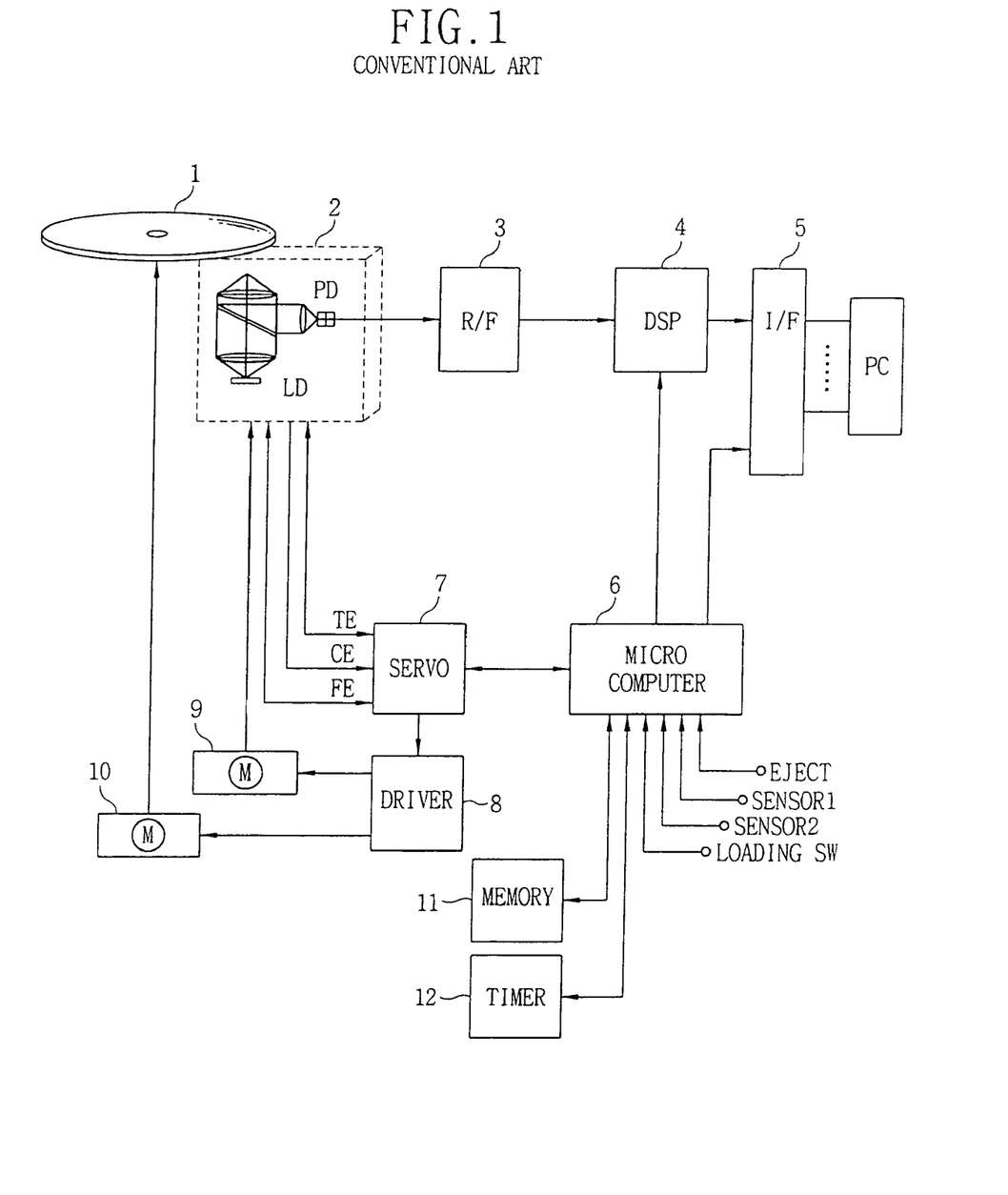
FIG. 1 is a schematic block diagram showing a construction of a general optical disk driver in accordance with a conventional art.

As shown in FIG. 1, typically, a CD-ROM driver, an optical disk driver that reads out a signal recorded on an optical disk such as a CD-ROM and transmits it to a host such as a personal computer through an interface, includes an optical pick-up 2 for reading a signal recorded on an optical disk 1; a wave-filtering/shaping unit (RF) 3 for wave-filtering/shaping the signal read by the optical pick-up 2, converting it to a binary signal and outputting it; a digital signal processing unit (DSP) for processing the binary signal to a digital signal and restoring it to a digital data and outputting it; an interface unit 5 for transmitting the restored digital data to a connected host such as a personal computer; a sled motor 9 for moving the optical pick-up 2; a spindle motor 10 for rotating the optical disk 1; a driver 8 for driving the sled motor 9 and the spindle motor 10 to be rotated; a servo unit 7 for controlling operations of the optical pick-up 2 and the driver 8; a MICROCOMPUTER 6 for controlling operations of the servo unit 7 and the digital signal processing unit 4; a memory 11 for storing a data required for controlling operation of the MICROCOMPUTER 6; a timer 12; and an eject key for inserting or ejecting the optical disk 1, a plurality optical sensors 1 and 2 installed in a loading mechanism that leads in the optical disk 1 mounted on a tray (not shown) and a loading switch.

The operation of the CD-ROM driver constructed as described above will now be explained.

When the optical disk 1 is mounted on the tray (not shown) prepared in the CD-ROM driver, the loading mechanism is driven to lead the tray on which the optical disk 1 has been mounted to inside the CD-ROM driver, and the inserted optical disk is clamped by a clamper (not shown).

Thereafter, when the spindle motor 10 is rotated according to a driving voltage supplied from the driver 8 and thus the optical disk 1 is rotated at a high speed, in order to read out a signal recorded on the recording surface of the optical disk 1, the optical pick-up 2 renders a laser diode provided therein to luminesce to thereby form an optical spot on the recording surface. The reflected light of the optical spot as formed is converted to an electric signal by a photo diode provided in the optical pick-up 2, to be outputted.

The outputted electric signal is converted to a binary signal by the wave-filtering/shaping unit 3, processed to a digital signal by the digital signal processing unit 4, and restored to a digital data so as to be transmitted to the host such as a personal computer connected through the interface unit 5.

The disk loading operation in which the optical disk mounted on the tray is inserted to perform a reading operation by the optical pick-up will now be described with reference to FIGS. 2A through 2F.

FIGS. 2A through 2F illustrate sequential processes of disk loading after the optical disk is mounted on the tray and is inserted into the CD-ROM driver.

A shown in the drawing, in the path on which the optical disk mounted on the tray, there is provided the plurality of optical sensors S1 and S2 to sense a type of the optical disk, that is, the size of the optical disk. For example, the first optical sensor S1, like a photocoupler, installed in the central inner portion of the lead-in path of the optical disk senses whether a led-in optical disk has a size of 8 cm, and the second optical sensor S2 installed in the central outer portion of the lead-in path of the optical disk senses whether a led-in optical disk has a size of 12 cm. And, the loading switch SW installed in the rear portion of the lead-in path senses whether the led-in optical disk has been completed clamped.

Figure 2:
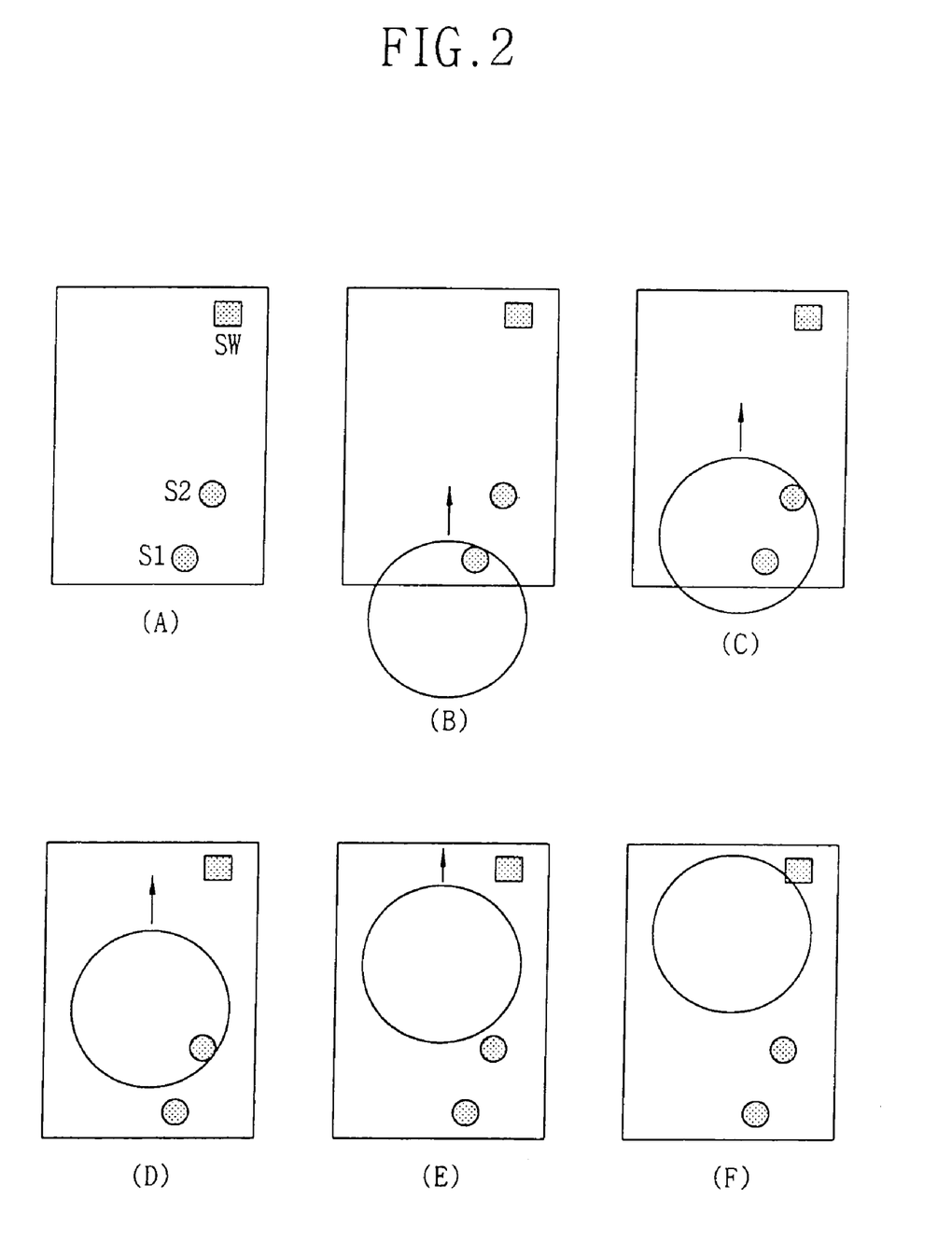
FIGS. 2A through 2F illustrate a sequential loading status and processes.

That is, in case that the optical disk mounted on the tray has the size of 12 cm, as shown in FIG. 2C, light emitted from the first and second optical sensors S1 and S2 are all blocked, so that the MICROCOMPUTER 6 receives sensing signals, that is, low level signals, from the first and the second optical sensors S1 and S2 to thereby discriminate the optical disk as having the size of 12 cm, and as shown in FIG. 2F, clamping completion status is discriminated by the loading switch that is turned on or turned off according to the clamping operation.

Meanwhile, in case that no optical disk is mounted on the tray, the first and the second optical sensors S1 and S2 outputs sensing signals, that is, high level signals, respectively.

In case that the optical disk mounted on the tray has the size of 8 cm, the first and the second optical sensors S1 and S2 outputs a low level signal and a high level signal as sensing signals, respectively.

According to the sensing signals sensed by the first and the second optical sensors and the ON/OFF state of the loading switch SW as the tray is inserted, the MICROCOMPUTER 6 discriminates the type of the optical disk, that is, the size of the optical disk, and whether clamping has been completed, transmits corresponding information through the interface unit 5 to the personal computer PC. Thereafter, according to commands requested by the personal computer, the MICROCOMPUTER 6 performs data reading operation.

However, the optical disk happens to be jammed during the disk loading operation, more particularly in a disk driver of slot loading type. For example, the optical disk may be unsuitably mounted on the tray or the optical disk is jammed due to an error of the loading mechanism, so that the state as shown in FIGS. 2C, 2D or 2E is maintained for more than a predetermined time. In this case, no solution has been proposed to transmit information reporting the optical disk jammed status so that an ejecting operation itself is performed upon discrimination of the jammed status or the host connected through the interface unit 5 transmits a corresponding command instructing an ejection. This causes users' inconvenience in that the user should directly check the disk jammed status and manually press an eject key to eject the disk.

SUMMARY OF THE INVENTION

Therefore, an object of the present invention is to provide a method for checking disk loading status in an optical disk driver by which a loading status of an optical disk is segmented to be discriminated during the multiple loading stages of the disk, for which in case that a disk-jammed status is discriminated, corresponding information is transmitted to a host connected through an interface, so that a disk ejection command is outputted from the host or a disk ejection operation is performed by itself.

To achieve these and other advantages and in accordance with the purpose of the present invention, as embodied and broadly described herein, there is provided a method for checking a disk loading status in an optical disk including the steps of: discriminating a loading status of an optical disk by multi-stage; transmitting corresponding information to a host connected through an interface in case that disk has been jammed upon discrimination; and performing disk-ejection operation according to a disk ejection command received from the host.

In the step of discriminating the loading status of an optical disk by multi-stage of the method for checking a disk loading status in an optical disk, a loading status of an optical disk is discriminated by multi-stage on the basis of sensing signals respectively outputted from a plurality of optical sensor for sensing a size of the optical disk and from a loading switch for sensing whether the optical disk has been clamped.

In order to achieve the above object, there is also provided a method for checking a disk loading status in an optical disk including the steps of: discriminating a loading status of an optical disk during the multiple loading stages of the disk; and performing a disk-ejection operation by itself in case that the disk has been jammed upon discrimination.

This method further includes a step of transmitting information reporting the disk-ejection to a connected host.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
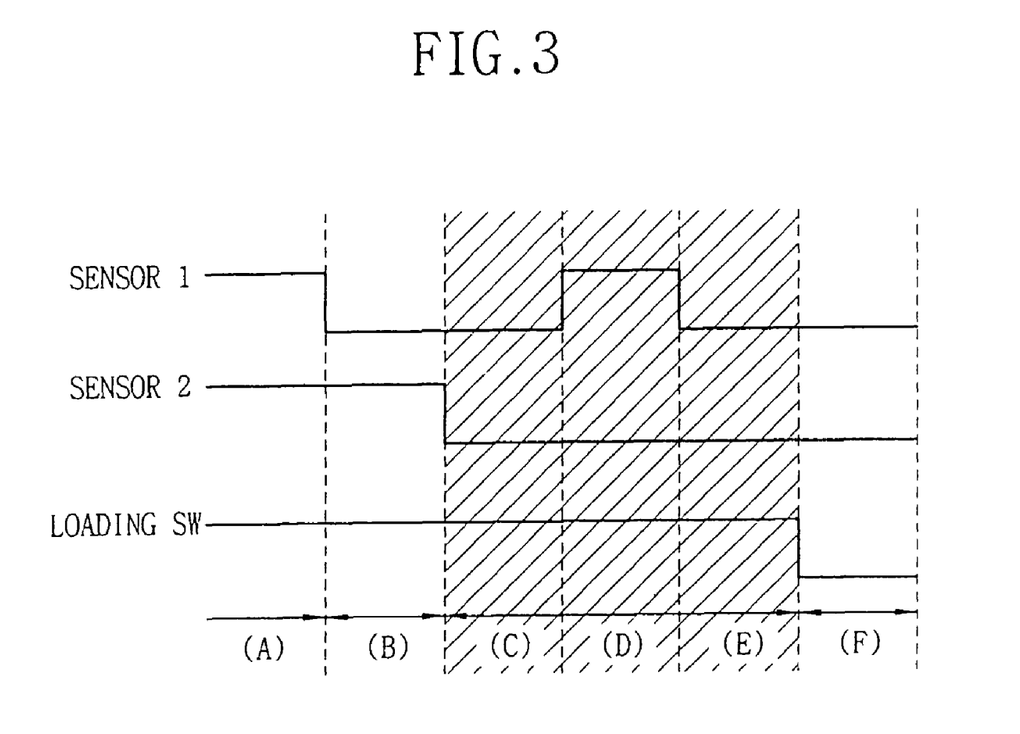
FIGS. 3A through 3F illustrate levels of sensing signals sensed according to disk loading operation.
Figure 4:
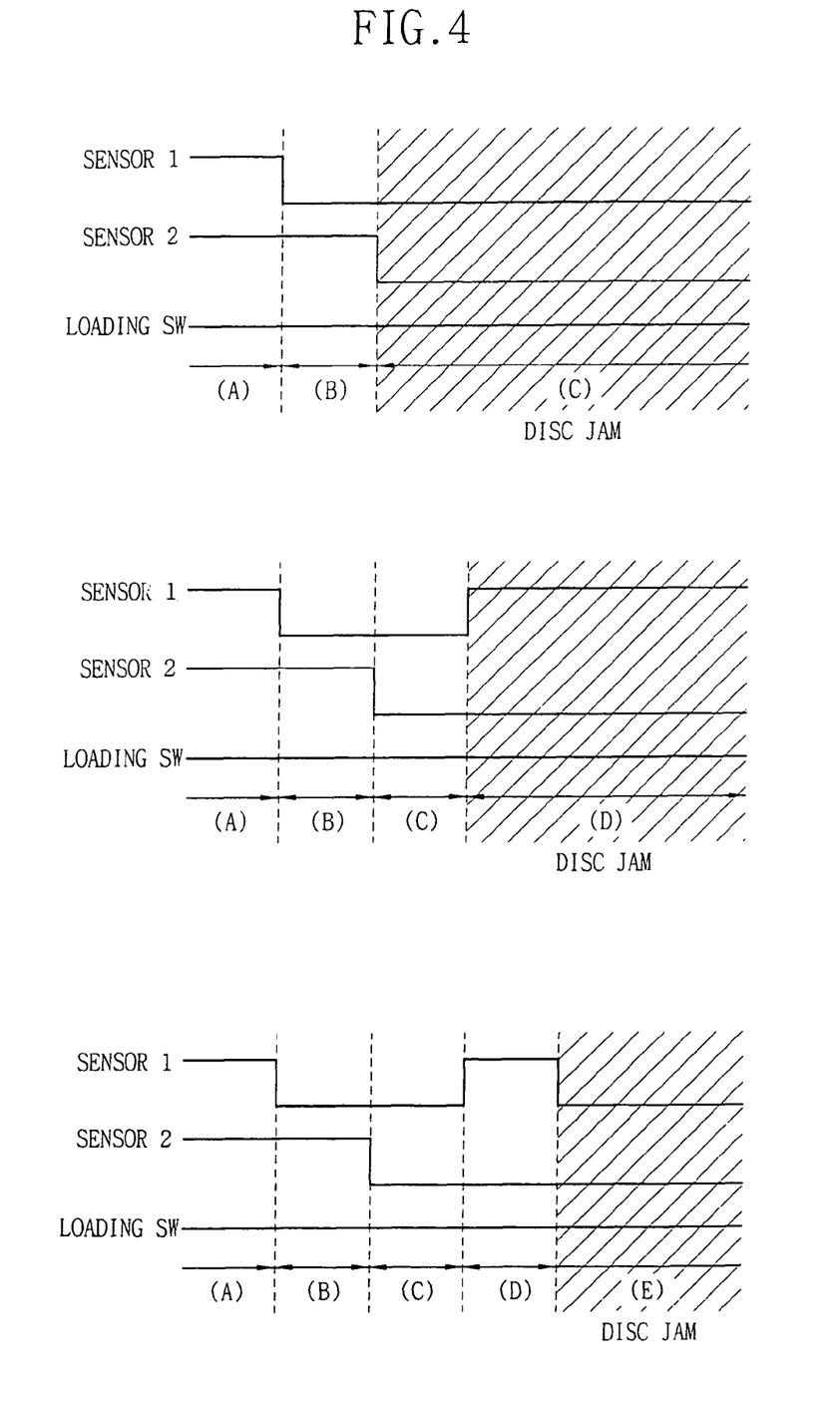
FIG. 4 illustrates levels of sensing signal as a disk is jammed during a disk loading operation.

FIGS. 2A through 2F illustrate a sequential loading status and processes, FIGS. 3A through 3F illustrates levels of sensing signals sensed according to disk loading operation, and FIG. 4 illustrates levels of sensing signal as a disk is jammed during a disk loading operation.

In the method for checking a disk loading status in an optical disk driver in accordance with the present invention, the multi-stage disk loading status is discriminated as shown in FIGS. 2A through 2F and FIGS. 3A through 3F. In case that levels of sensing signals outputted from the first and the second optical sensors S1 and S2 and from the loading switch SW are maintained for more than a predetermined time as shown in FIG. 4, the MICROCOMPUTER 6 discriminates it as a disk jammed status.

That is, after the disk is inserted, if no sensing signal indicating that clamping has been completed is detected from the loading switch for more than a predetermined time, it is discriminated that the disk has been jammed.

In detail, as shown in FIG. 3A, in case that there is no optical disk mounted on the tray 1, all of the levels of the sensing signals respectively outputted from the first and the second optical sensors S1 and S2 and from the loading switching SW become high, while, as shown in FIG. 3B, in case of initial loading status that the optical disk 1 is mounted on the tray and let in, the levels of the sensing signals respectively outputted from the first and the second optical sensors S1 and S2 and from the loading switch SW become low, high and high, respectively.

And, as shown in FIGS. 3C through 3E, in case of a loading status that the disk is jammed, the levels of the sensing signals respectively outputted from the first and the second optical sensors S1 and S2 and from the loading switch SW become 'low, low, high', 'high, low, high' and 'low, low high', respectively, the status of which is detected for more than a predetermined time as shown in FIG. 4, whereas, as shown in FIG. 3F, in case that the led-in disk is completely clamped, the levels of the sensing signals respectively outputted from the first and the second optical sensors S1 and S2 and from the loading switch SW become 'low, low, low' respectively. Accordingly, on the basis of the sensing signals respectively outputted from the first and the second optical sensors S1 and S2 and from the loading switch SW, the MICROCOMPUTER 6 segmented the current disk loading status into multiple loading stages to be discriminated.

Especially, as shown in FIG. 4, in case that the values of the sensing signals respectively outputted from the first and the second optical sensors S1 and S2 and from the loading switch SW are maintained for more than a predetermined time, or in case that no sensing signal indicating completion of clamping is detected from the loading switch for more than a predetermined time after the disk is inserted, it is discriminated that the disk has been jammed and a disk-ejecting operation is performed.

The disk-ejecting operation will now be described with reference to accompanying drawings.

Figure 5:
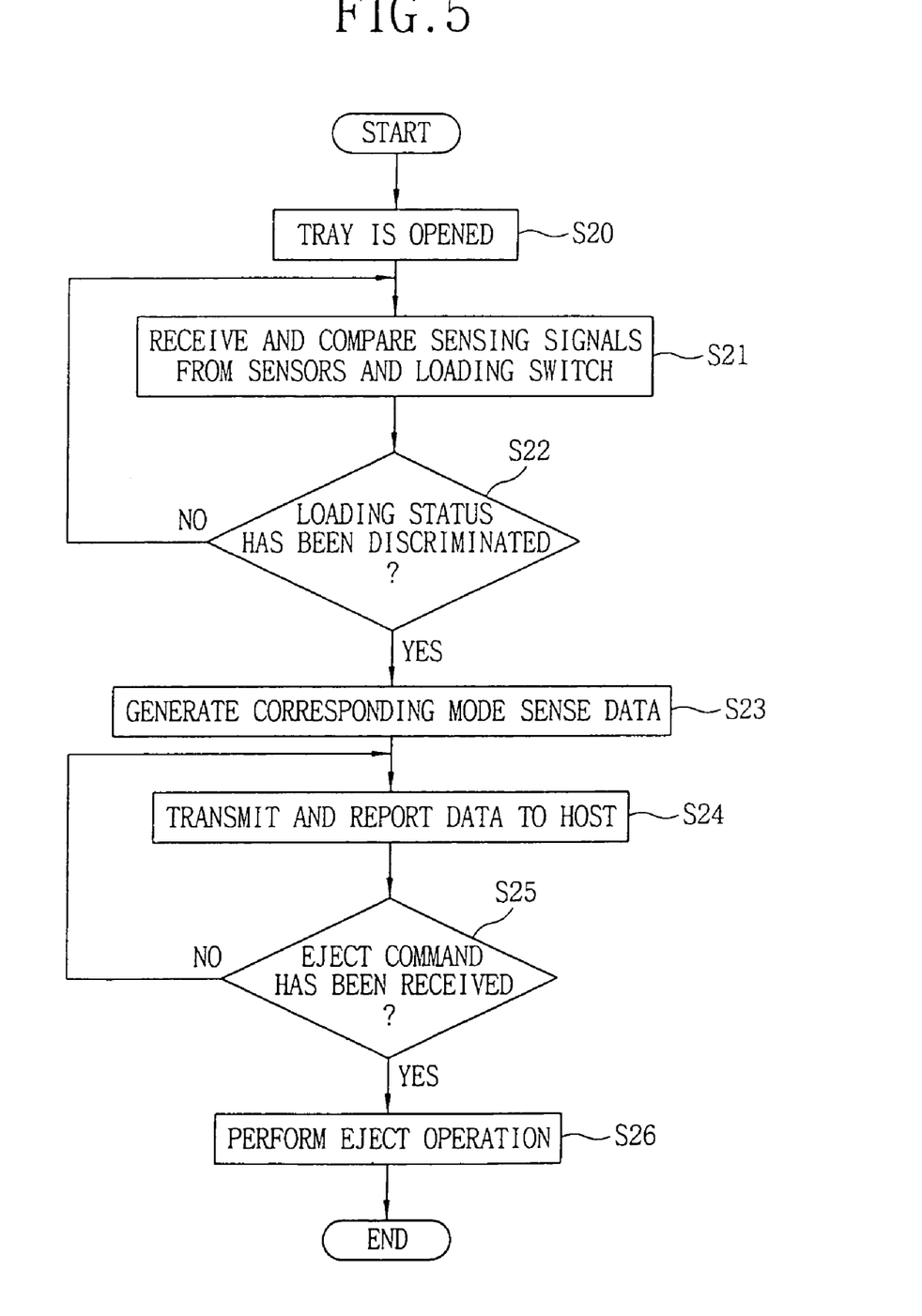
FIG. 5 is a flow chart of a method for checking a disk loading status in an optical disk driver in accordance with one embodiment of the present invention.

FIG. 5 is a flow chart of a method for checking a disk loading status in an optical disk driver in accordance with one embodiment of the present invention.

First, when the tray is opened to insert the optical disk 1 and closed (S20), a disk loading operation is performed that the tray on which the optical disk is mounted is inserted into the optical disk driver according to the driving of the loading mechanism. At this time, the MICROCOMPUTER 6 receives and compares the sensing signals respectively outputted from the first and the second optical sensors S1 and S2 and from the loading switch SW (S21), and discriminates the loading status of the optical disk 1 as shown in FIGS. 3A through 3F by multi-stage (S22).

Upon discrimination, the MICROCOMPUTER 6 generates a corresponding mode sense data as previously defined (S23) and transmits the generated mode sense data to the host (a personal computer) connected through the interface unit 5 to report each disk loading status discriminated during the multiple loading stages of each disk.

In this respect, in case that the interface unit 5 uses the typically used ATAPI bus for interfacing with the personal computer, the MICROCOMPUTER generates a mode sense data in a 12 byte packet command format as defined by the ATAPI communication protocol and transmits each disk loading status discriminated by during the multiple loading stages of each disk for reporting.

Figure 6A:
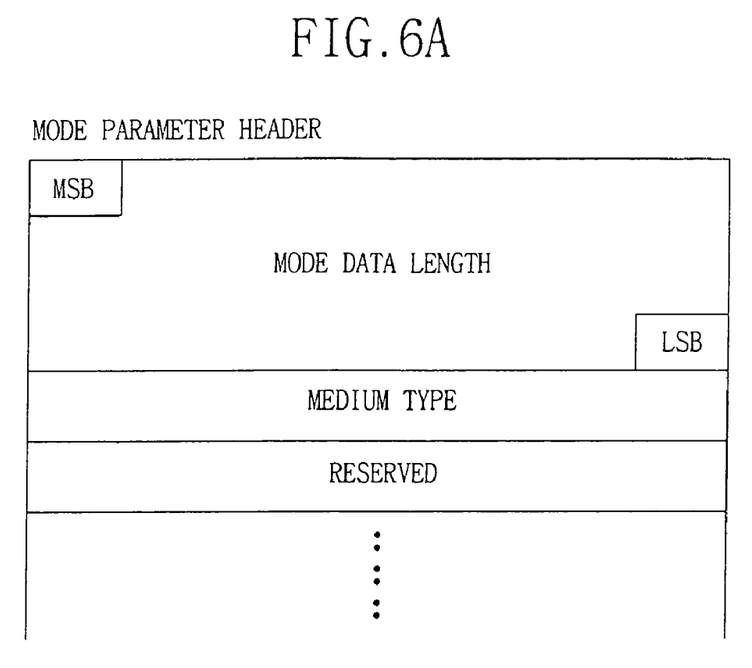
FIG. 6 illustrates a mode parameter header and code format for a CD-ROM disk type in accordance with the present invention.
Figure 6B:
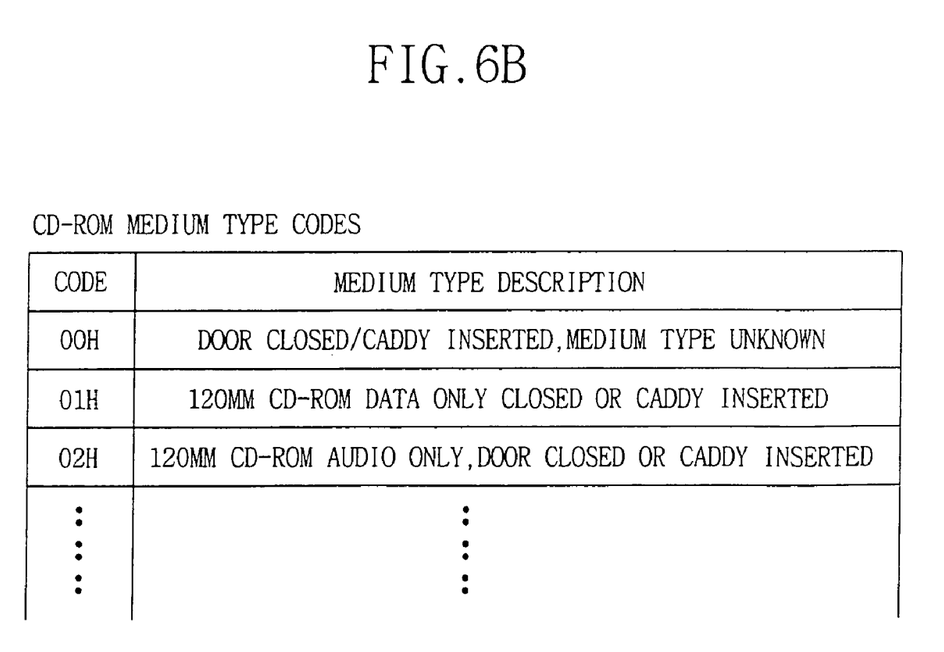

For example, as shown in FIG. 6, variable values recorded in a recording medium type code among header information of the previously defined mode sense parameter are recorded to be difference to each other according to the disk loading status, to be transmitted and reported to the host.

Namely, in case that the disk loading status of FIGS. 3A and 3B are maintained for more than a predetermined time, the variable values are recorded in the recording medium type code field by "h'71" and "h'71/h'F2', respectively, and the current disk status is transmitted to the host. Meanwhile, in case that a disk loading status of FIG. 4 is maintained for more than a predetermined time, that is, a disk-jammed status is maintained, the variable value is recorded by "h'F2" and the disk-jammed status is transmitted to be reported.

Thereafter, according to the transmission and report of the mode sense data corresponding to the disk loading status, in case that the MICROCOMPUTER 6 receives an eject command requesting disk-ejection operation from the host, it drives the loading mechanism to perform the requested disk-ejection operation, so that the disk-jammed status is not maintained for more than a predetermined time.

In this manner, in the optical disk driver adopted to the present invention, the disk loading status is discriminated during multiple loading stages and the corresponding mode sense data is transmitted to the host. And then, the disk-ejection operation is performed according to the eject command requested by the host, whereby the disk-ejection operation is automatically performed with the disk-jammed status.

Figure 7:
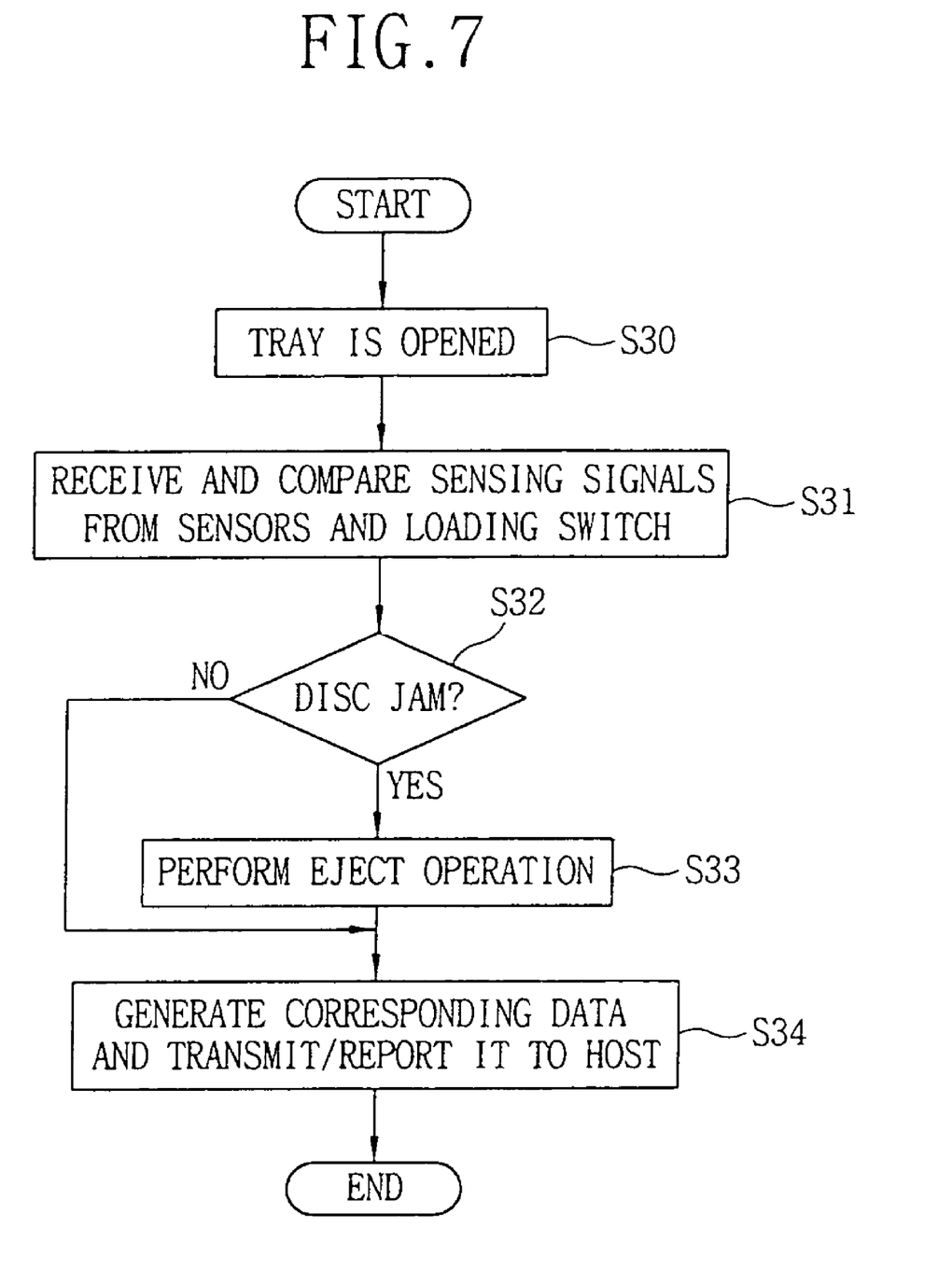
FIG. 7 is a flow chart of a method for checking a disk loading status in an optical disk driver in accordance with another embodiment of the present invention.

FIG. 7 is a flow chart of a method for checking a disk loading status in an optical disk driver in accordance with another embodiment of the present invention.

Likewise in the former embodiment of the present invention, when the tray is opened to insert the optical disk 1 and closed (S30), a disk loading operation is performed that the tray on which the optical disk is inserted into the optical disk driver according to the driving of the loading mechanism. At this time, the MICROCOMPUTER 6 receives and compares the sensing signals respectively outputted from the first and the second optical sensors S1 and S2 and from the loading switch SW (S31), and discriminates the loading status of the optical disk 1 as shown in FIGS. 3A through 3F during multiple loading stages (S32).

Upon discrimination, in case that the disk has been jammed, the MICROCOMPUTER 6 drives the load mechanism by itself to quickly perform a disk-ejecting operation (S33), generates a mode sense data for reporting the disk-ejection operation, and transmits it the host such as the personal computer connected through the interface unit 5 (S34).

Meanwhile, upon discrimination, in case that the disk is in a state of FIGS. 3A, 3B and 3F, the MICROCOMPUTER generates a mode sense data having a corresponding variable value, and transmits it to the host. And then, the MICROCOMPUTER receives a corresponding command from the host and performs a corresponding operation such as data reading.

Accordingly, in the optical disk driver adopted to the present invention, the disk loading status is discriminated during multiple loading stages and a corresponding mode sense data is transmitted to the host. In addition, when the disk is discriminated to have been jammed, the loading mechanism is driven by itself, thereby quickly performing the disk-ejection operation.

As so far described, according to the method for checking disk loading status in an optical disk driver of the present invention, a loading status of an optical disk is segmented to be discriminated during multiple loading stages, and in case that a disk-jammed status is discriminated, corresponding information is transmitted to a host connected through an interface, so that a disk ejection command is outputted from the host or a disk ejection operation is performed by itself to thereby automatically perform the disk-ejection operation for the disk-jammed status.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for checking disk loading status in an optical disk driver having a plurality of optical sensors and a disk loading switch, comprising:
    receiving sensing signals respectively outputted from the plurality of optical sensors and from the disk loading switch for sensing whether an optical disk has been completely loaded in the optical disk driver;
    discriminating loading status of the optical disk during multiple loading stages of the optical disk on the basis of the sensing signals respectively outputted from the plurality of optical sensors and from the disk loading switch;
    transmitting information to a host connected through an interface to the optical disk driver when the optical disk has been jammed based on the discrimination; and
    performing a disk-ejection operation according to a disk ejection command received from the host,
    wherein when a combination of the sensing signals respectively outputted is not a value indicating a state that the optical disk is mounted and being maintained as such for more than a predetermined time, it is discriminated that the optical disk has been jammed in the optical disk driver.

2. The method according to claim 1, further comprising:
    transmitting information for reporting the disk-ejection operation to the host.

3. A system for checking disk loading status in an optical disk driver having multiple disk loading stages, a plurality of optical sensors and a disk loading switch, comprising:
    a microcomputer configured to receive sensing signals respectively outputted from the plurality of optical sensors and from the disk loading switch for sensing whether the optical disk has been completely loaded in the optical disk driver, to discriminate loading status of the optical disk during multiple loading stages of the optical disk on the basis of the sensing signals respectively outputted from the plurality of optical sensors and from the disk loading switch and to transmit information to a host connected through an interface to the optical disk driver when the optical disk has been jammed in the optical disk driver based on the discrimination; and a driving mechanism configured to perform a disk-ejection operation according to a disk ejection command received from the host, wherein the microcomputer is configured to discriminate that the optical disk has been jammed in the optical disk driver when a combination of the sensing signals respectively outputted is not a value indicating a state that the optical disk is completely mounted and being maintained as such for more than a predetermined time.

4. The system according to claim 3, wherein the microcomputer is configured to compare the sensing signals respectively outputted from the optical sensors and from the disk loading switch, and discriminate the loading status of the optical disk based on the comparison.

5. The system according to claim 4, wherein the microcomputer is configured to transmit information for reporting the loading status of the optical disk to the host.

6. The system according to claim 3, wherein the optical disk driver is a CD-ROM driver.

* * * * *